United States Patent [19]

Errass et al.

[11] Patent Number: 4,497,843
[45] Date of Patent: Feb. 5, 1985

[54] STABLE LIQUID OIL-IN-WATER EMULSION AND PROCESS

[75] Inventors: Werner Errass, Riehen; Eduard Waldmeier, Allschwil, both of Switzerland

[73] Assignee: Societe d'Assistance Technique pour Produits Nestle S.A., Lausanne, Switzerland

[21] Appl. No.: 558,487

[22] Filed: Dec. 6, 1983

[30] Foreign Application Priority Data

Jul. 15, 1983 [CH] Switzerland ............ 3883/83

[51] Int. Cl.$^3$ ............................................. A23D 5/00
[52] U.S. Cl. ..................................... 426/602; 426/613; 426/573; 426/575; 252/312
[58] Field of Search .............. 426/602, 573, 575, 613; 252/312

[56] References Cited

U.S. PATENT DOCUMENTS 4,389,426  6/1983  Reissmann et al. ............... 426/602
4,414,236 11/1983  Moran et al. .................. 426/602 X

FOREIGN PATENT DOCUMENTS 151479  11/1981  Japan ........................... 426/602
7206360 12/1982  Japan ........................... 426/602

Primary Examiner—Robert Yoncoskie
Attorney, Agent, or Firm—Vogt & O'Donnell

[57] ABSTRACT

The invention discloses an oil-in-water emulsion containing a mixture of *Carraghenan iota* and *Gummi arabicum* which is in the form of drops of oil having a diameter of from 0.5 to 4 mm which are suspended individually in a stable manner in an acid aqueous phase, and to a production process therefor.

7 Claims, No Drawings

STABLE LIQUID OIL-IN-WATER EMULSION AND PROCESS

This invention relates to an oil-in-water emulsion particularly suitable for clear salad dressings based on vinegar and oil, which is in the form of drops of oil suspended individually in a stable manner in an aqueous phase, and to a process for the production thereof.

Finely emulsified salad dressings with oil, sometimes called French dressings, are now very well established in the consumer field.

Salad dressings of this type are based on the use of an emulsifying substance, in most cases egg yolk, but they achieve their stability only by a very fine distribution of the oil in the aqueous phase. This fine distribution of the oil droplets leads to the opaque, mayonnaise-like appearance of these dressings.

In contrast to the above-mentioned French dressings, a clear salad dressing with oil precludes the use of egg yolk to stabilize the emulsion. Likewise, homogenisation cannot be used.

Thus, the various clear salad dressings with oil which are available on the market suffer from the serious disadvantage that on standing, an oil layer forms after a short time, that is the two phases separate.

Products of this type have to be homogenised by shaking before use.

This invention relates to a production process which eliminates the above-described disadvantages, namely the formation of an oil layer in the salad dressing and the need for repeated homogenisation of the dressing by shaking.

Without wishing to restrict the present invention thereby, it has surprisingly been found that under certain conditions, a combination of two different stabilizers, namely a thickening agent which forms a linear gel in the aqueous phase, together with a stabilizer covering the oil droplets, produces a product, in which the oil is present in stable, non-coalescing droplets.

The emulsion according to the present invention basically consists of an acid aqueous phase, from 10 to 50% by weight of oil, and additives.

The emulsion is characterized in that it contains from 0.3 to 0.7% of *Carraghenan iota* and from 0.1 to 0.4% of *Gummi arabicum* (gum acacia), and it is in the form of drops of oil having a diameter of from 0.5 to 4 mm which are suspended individually in an aqueous phase.

According to one process for the preparation of the emulsion of this invention an aqueous phase is prepared by mixing water and acid, and then adding salt, seasoning, *Carraghenan iota* and *Gummi arabicum*. The *Carraghenan iota* is thickened by heating, followed by cooling and the optional addition of aromatic herbs, and finally the aqueous phase prepared in this way is stirred together with oil, preferably by means of a gently operating emulsifying apparatus.

In one embodiment of the present invention, water and from 1.5 to 3.4% of acid, for example acetic acid, are introduced into a conventional mixer in order to achieve a pH of from 3.6 to 3.8.

An appropriate quantity of salt and seasoning, from 0.4 to 0.9% of *Carraghenan iota* and from 0.15 to 0.5% of *Gummi arabicum* (gum acacia) are added. *Carraghenan iota* is described in "Gums and Stabilisers for the Food Industry", Pergamon Press, Oxford 1982, pages 55 et seq, among other publications.

The above described aqueous phase is then heated to a temperature of from 87° to 91° C. with a holding time of 1 to 4 minutes, for example in a plate heat exchanger, in order to thicken the *Carraghenan iota*, and is then cooled to from 15° to 25° C. Finely chopped aromatic herbs may be added.

Finally, the thickened aqueous phase is introduced together with oil into a gently operating emulsifying apparatus. Such an apparatus consists of, for example a cylindrical jacket having interior transverse foraminous plates, between which blades rotate on a vertical axis. The aqueous phase and the oil are introduced at the bottom and the emulsion exits at the top. The blades do not perform a beating action, but stir gently producing laminar flow, the Reynolds number ranging from 1,000 to 2,000, preferably about 1,200. Similar effects may be achieved using pulsating or vibrating apparatus. The product which is obtained is quite extraordinary. It will be termed an emulsion for reasons of simplicity, without thereby wishing to restrict its definition. It presents itself as uniform drops of oil having a diameter of from 0.5 to 4 mm which are suspended individually in an aqueous phase.

The product remains quite stable for at least several months without the oil droplets coalescing. In a transparent container the individual oil drops give the product, which is transparent to light but is not cloudy, a very unusual, somewhat sparkling appearance. Since it is very stable the product may be stored in an intermediate container before being bottled.

The present process allows in particular the industrial preparation of very fluid dressings based on oil and vinegar, without the phases separating during storage of the product.

The following Table gives the composition of several dressings by way of example.

EXAMPLES

|  | I | II | III | IV | V |
| --- | --- | --- | --- | --- | --- |
| Oil | 50.00 | 40.00 | 35.00 | 20.00 | 10.00 |
| Water | 16.70 | 10.62 | 20.80 | 26.10 | 36.15 |
| Vinegar (4.5% acetic acid) | 29.30 | 45.33 | 38.10 | 46.90 | 46.90 |
| Common Salt | 2.00 | 2.00 | 3.10 | 4.50 | 3.50 |
| Carraghenan iota | 0.30 | 0.35 | 0.60 | 0.65 | 0.70 |
| Gummi arabicum | 0.15 | 0.20 | 0.30 | 0.35 | 0.35 |
| Flavour intensifier | 0.50 | 0.50 | 0.40 | 0.70 | 1.00 |
| Seasoning essence | 1.05 | 1.00 | 1.00 | 0.80 | 1.40 |
| Herbs | — | — | 0.70 | — | — |
|  | 100.00 | 100.00 | 100.00 | 100.00 | 100.00 |

We claim:

1. An oil-in-water emulsion comprising from 10 to 50% of oil, from 0.3 to 0.7% by weight of *Carraghenan iota* and from 0.1 to 0.4% by weight of *Gummi arabicum*, said emulsion being in the form of drops of oil having a diameter of from 0.5 to 4 mm which are suspended individually in a stable manner in an acid aqueous phase.

2. An emulsion according to claim 1, containing from 1.3 to 2.2% of an edible acid.

3. An emulsion according to claim 2, in which said edible acid is acetic acid.

4. A process for the production of an oil-in-water emulsion according to claim 1, which comprises the steps of producing an aqueous phase by adding from 1.5 to 3.4% by weight of an edible acid, from 0.4 to 0.9% by weight of *Carraghenan iota*, from 0.15 to 0.5% by weight of *Gummi arabicum,* salt and seasoning to water, thickening said *Carraghenan iota* by heating said aqueous phase, cooling said aqueous phase to from 15° to 25° C. and mixing said aqueous phase with oil to form said emulsion.

5. A process according to claim 4, in which said thickening takes place by heating to a temperature of from 87° to 91° C. with a holding time of from 1 to 4 minutes.

6. A process according to claim 4, in which said stirring produces laminar flow with a Reynolds number of from 1,000 to 2,000.

7. A process according to claim 4, further comprising adding finely chopped aromatic herbs after said cooling and before said mixing.

* * * * *